United States Patent
Janzen

[19]

[11] Patent Number: 6,158,573
[45] Date of Patent: Dec. 12, 2000

[54] CONVEYOR BELT FOR THE TRANSPORT OF WORKPIECES

[75] Inventor: Klaus Janzen, Lünen, Germany

[73] Assignee: Neuhäuser, GmbH & Co, Lunen, Germany

[21] Appl. No.: 09/114,775

[22] Filed: Jul. 14, 1998

[30] Foreign Application Priority Data

Jul. 24, 1997 [DE] Germany .......................... 197 31 902

[51] Int. Cl.$^7$ ................................................. B65G 17/46
[52] U.S. Cl. ..................................... 198/689.1; 198/803.5
[58] Field of Search .............................. 198/689.1, 471.1, 198/803.5, 844.5

[56] References Cited

U.S. PATENT DOCUMENTS

| | | | |
|---|---|---|---|
| 3,592,334 | 7/1971 | Fleischauer | 198/689.1 |
| 3,708,058 | 1/1973 | Kalven | 198/689.1 |
| 4,322,993 | 4/1982 | Stumf | 198/689.1 |
| 4,670,935 | 6/1987 | Bowler | 198/689.1 |

FOREIGN PATENT DOCUMENTS

| | | |
|---|---|---|
| 3001531 | 7/1981 | Germany . |
| 4102130 | 7/1992 | Germany . |
| 19614741 | 7/1997 | Germany . |

*Primary Examiner*—Christopher P. Ellis
*Assistant Examiner*—Khoi H. Tran
*Attorney, Agent, or Firm*—Rosenman & Colin LLP

[57] ABSTRACT

A conveyor belt for the transport of workpieces, in particular for the suspended transport of platelike workpieces, such as metal sheets or boards generally comprises a belt body having suction orifices which are connected to a vacuum duct in a vacuum device. The conveyor belt together with the workpieces to be paid onto it are guided past the vacuum device in a transport plane direction and the workpieces are retained on the conveyor belt by generating a vacuum in the vacuum duct consequently at the suction orifices and with two or more rear sealing lips integrally formed on the belt body (2), the sealing lips engage into at least sealing gap in the vacuum device to seal off the vacuum duct. Each sealing lip is provided with its own sealing gap in the vacuum device and the sealing lips center themselves and, at the same time, seal off the vacuum duct and are held under prestress in the sealing gaps.

18 Claims, 3 Drawing Sheets

CONVEYOR BELT FOR THE TRANSPORT OF WORKPIECES

BACKGROUND OF THE INVENTION

The invention relates to a conveyor belt for the transport of workpieces, in particular for the suspended transport of platelike workpieces, such as metal sheets or boards, with a belt body having suction orifices which are connected to a vacuum duct in a vacuum device, the conveyor belt, together with the workpieces to be laid onto it, being guided, in bearing contact, past the vacuum device in the transport (plane) direction, and the workpieces being retained on the conveyor belt by generating a vacuum in the vacuum duct and consequently at the suction orifices, and with two or more rear sealing lips integrally formed on the belt body, the two sealing lips engaging into at least one sealing gap in the vacuum device for the purpose of sealing off the vacuum duct. In addition to suspended transport, of course, horizontal and even vertical transport are also possible.

A conveyor belt of the initially described form of construction became known from DE 196 14 741 C1. This conveyor belt is used in conjunction with a combined vacuum/magnet system. It consequently serves for the transport of both ferromagnetic workpieces (by means of a magnet system) and nonferromagnetic workpieces (by means of the vacuum system). This combined operating mode normally means that compromises are made in the design of the known conveyor belt. These may include a reduced suction capacity which is attributable to the use of flat seals. Also, leakages cannot be ruled out in the known conveyor belt. In addition, bent or dented metal sheets or boards are not always sufficiently retained. This is because the front suction recesses are scarcely in a position to be able to adapt to the contour of a workpiece having pronounced curvature.

Irrespective of this, DE-A-30 01 531 discloses a conveyor belt with textile or metallic reinforcements embedded into a core layer made of rubber or elastomeric plastics. In addition, elevations, which serve partly as suction recesses, are located on a cover plate. The problems involved in the elimination of leakages and in suction adapted to the workpiece contour are not discussed.

Finally, DE-A 41 02 130 discloses a two-lip seal, in which, while sealing remains the same without any change, the distance between radial and axial annular faces and the sealing lips is greater than 0, equal to 0 or smaller than 0, with composite systems of these being included. In this way, various sealing conditions (sliding seal, labyrinth seal or composite systems of these) are to be capable of being controlled in the case of a two-lip seal with the aid of the simplest means.

The object on which the invention is based is to develop a generic conveyor belt in such a way that leakages are minimized and, at the same time, optimal adaptation of the conveyor belt to the workpiece contour becomes possible.

SUMMARY OF THE INVENTION

To achieve this object, the invention proposes, in the case of a generic conveyor belt for the transport of workpieces, that each sealing lip be provided with its own sealing gap in the vacuum device, and that the sealing lips, centering themselves and, at the same time, sealing off the vacuum duct, be held under prestress in the sealing gaps. According to a preferred embodiment, the two sealing lips are designed to be opposite one another in relation to the suction orifices and in each case with inwardly directed sealing teeth, the sealing teeth engaging in each case into corresponding chamfers in the sealing gap. Furthermore, each sealing tooth conventionally has two tooth edges which are designed as a sealing edge and a closing edge and which form an acute angle between them, the sealing edge bearing on a sealing chamfer edge of the chamfer at a predetermined angle in relation to the transport plane direction, said sealing chamfer edge likewise being at a predetermined inclination in relation to the transport plane direction.

The acute angle between the sealing edge and closing edge ranges from about 20° to 60°. For the sealing edge, an angular range of about 20° to about 60° has proved advantageous as an angle of inclination in relation to the transport plane direction. The angle of inclination of the sealing chamfer edge in relation to the transport plane direction (usually in relation to the horizontal) ranges from about 30° to about 80°. These angle values refer in each case to the noninstalled state. In addition to the suspended transport of workpieces, of course, horizontal transport is also possible. The sealing lips extend, as a rule, along the entire conveyor belt. Additional sealing lips may, of course, be provided in addition to the two mandatory sealing lips, so that the conveyor belt has altogether 2, 3, 4 or more sealing lips.

At all events, in particular, leakages of the vacuum duct are avoided as a result of these measures as a whole. This is because the conveyor belt is held satisfactorily at the vacuum device and is guided along on the latter, without the vacuum between the conveyor belt and the associated contact face of the vacuum device being capable of escaping or collapsing at this point. This purpose is served, in particular, by the sealing teeth which engage under prestress into the corresponding chamfers. Due to the prestress, the sealing teeth are, in cross section, as it were, pressed apart from one another in the sealing gaps, so that the sealing edge nestles against the sealing chamfer edge of the chamfer. In all events, sliding bearing contact of the sealing edge against the sealing chamfer edge takes place in the contact region between the sealing edge and the sealing chamfer edge, specifically over a relatively wide range. This ensures, at the same time, that the two sealing teeth are, in practice, pivoted (upward) and, as a result of the altogether elastic design of the conveyor belt, the belt body is pressed against the vacuum device in this way.

In addition to these measures, which, in particular, prevent leakages, it is further preferably intended that front suction protuberances, into which the suction orifices open, be provided. These suction protuberances may be suction cups having internal bosses. Suction cups of this type can be pivoted back and forth easily (within a particular angular range), so that it is thereby possible to adapt to the workpiece contour without any leakage loss. In addition, the bosses, as a rule, are designed to limit the spring excursion of the suction cup. The bosses consequently ensure that, when a workpiece is being sucked up, the suction cups undergo deformation in a controlled and elastically returnable manner. Possible leakage losses are, once again, reduced as a result. Altogether, it is guaranteed that the vacuum acts satisfactorily on the workpieces to be sucked up, while, at the same time, adaptation to their contour takes place. This is particularly important, inasmuch as the platelike workpieces, such as metal sheets or boards, which are to be transported are usually received from a feed conveyor arrangement. Furthermore, the energy costs are markedly reduced, since costly vacuum generation can operate with a lower volumetric vacuum flow.

Further refinements are listed below. Thus, the acute angle between the sealing edge and closing edge amounts, as a rule, to about 30°. The sealing teeth are, in general, integrally formed in each case, on the head side, on a sealing web standing upright at the rear on the belt body. This sealing web generally extends perpendicularly in relation to the belt body. As a rule, the sealing lips will be designed as a U-profile integrally formed on the belt body, each sealing web, together with the headside sealing tooth, forming a U-leg, and the two sealing webs being connected on the foot side, to form a U-base, by means of a supporting web. The sealing lips can thereby be integrally formed as a one-part component on the belt body. In this case, the supporting web rests on the belt body and makes a corresponding connection. The supporting web has, in general, at least one central passage orifice which is arranged concentrically in relation to the corresponding suction orifice in the belt body, the sealing webs, together with the sealing teeth, being arranged mirror-symmetrically in relation to the passage orifice and the suction orifice. Principally, a corresponding passage orifice is provided for each suction orifice. In this case, in the course of a revolution of the conveyor belt, the suction orifices and the passage orifices regularly move in each case on a plane of longitudinal extent of the vacuum duct. This is a result of the self-centering alignment of the conveyor belt by the sealing lips and of the fact that the conveyor belt is altogether designed mirror-symmetrically. This means that it is thereby guaranteed that the suction orifices in each case form a maximum overlap with the vacuum duct. Cycle times can therefore be reduced to a minimum. The measures, whereby the suction cups have vacuum extension orifices for the suction orifices, are also aimed in the same direction. These vacuum extension orifices generally have a T-shaped cross section.

The belt body may be manufactured essentially from PUR (polyurethane) having a Shore hardness of about 90. PUR having a Shore hardness of about 55 is for the most part employed for producing the sealing lips and the suction cups with bosses. The above-mentioned Shore hardness is the so-called Shore hardness A. As is known, a Shore A hardness in the range of between 50 and 98 can be set by means of polyurethane (PUR) or PUR rubber, so that the above-mentioned ranges can be implemented without difficulty. This ensures, at all events, that the suction cups with bosses are designed to be altogether markedly softer than the belt body. They can consequently be adapted easily to the contour of the workpiece. The same applies accordingly to the sealing lips, which ensure outstanding leaktightness due to their relatively soft adjustment.

The belt body, consisting for the most part of (hard) PUR, may additionally have a polyamide (PA) coating, to reduce the coefficient of friction on its rear side facing the vacuum device, in the region of a contact face with the latter. The coefficients of friction can thereby be more than halved. In actual fact, coefficients of friction in the region of 0.5 are established for PUR friction on iron or steel, while the PA coating leads to coefficients of friction in the region of 0.2. In order to stabilize the belt body in the longitudinal direction, steel cords may additionally be introduced into this. Moreover, the belt body preferably has, introduced, transverse stiffenings and, if appropriate, ferromagnetic inserts. The latter serve for strengthening magnetic field forces which are applied. This may be required, for example, in the situation where the conveyor belt according to the invention having a vacuum device is combined with an additional magnetic device. Such a combination is discussed, for example, in German patent specification 196 14 741, already described initially.

Finally, there is preferably provision, further, for the belt body, the sealing lips designed as a U-profile and the suction cups to be connected to one another in each case by means of (plastic) welded joints. Efficient manufacture is achieved thereby. This is because the three components to be assembled in each case, namely the belt body, sealing lips and suction cups, may then be prefabricated and subsequently assembled to form the conveyor belt according to the invention.

BRIEF DESCRIPTION OF THE DRAWINGS

The invention is explained in more detail below with reference to the drawings which illustrates only one exemplary embodiment and in which.

DETAILED DESCRIPTION OF THE PREFERRED EMBODIMENT

Figure 1:
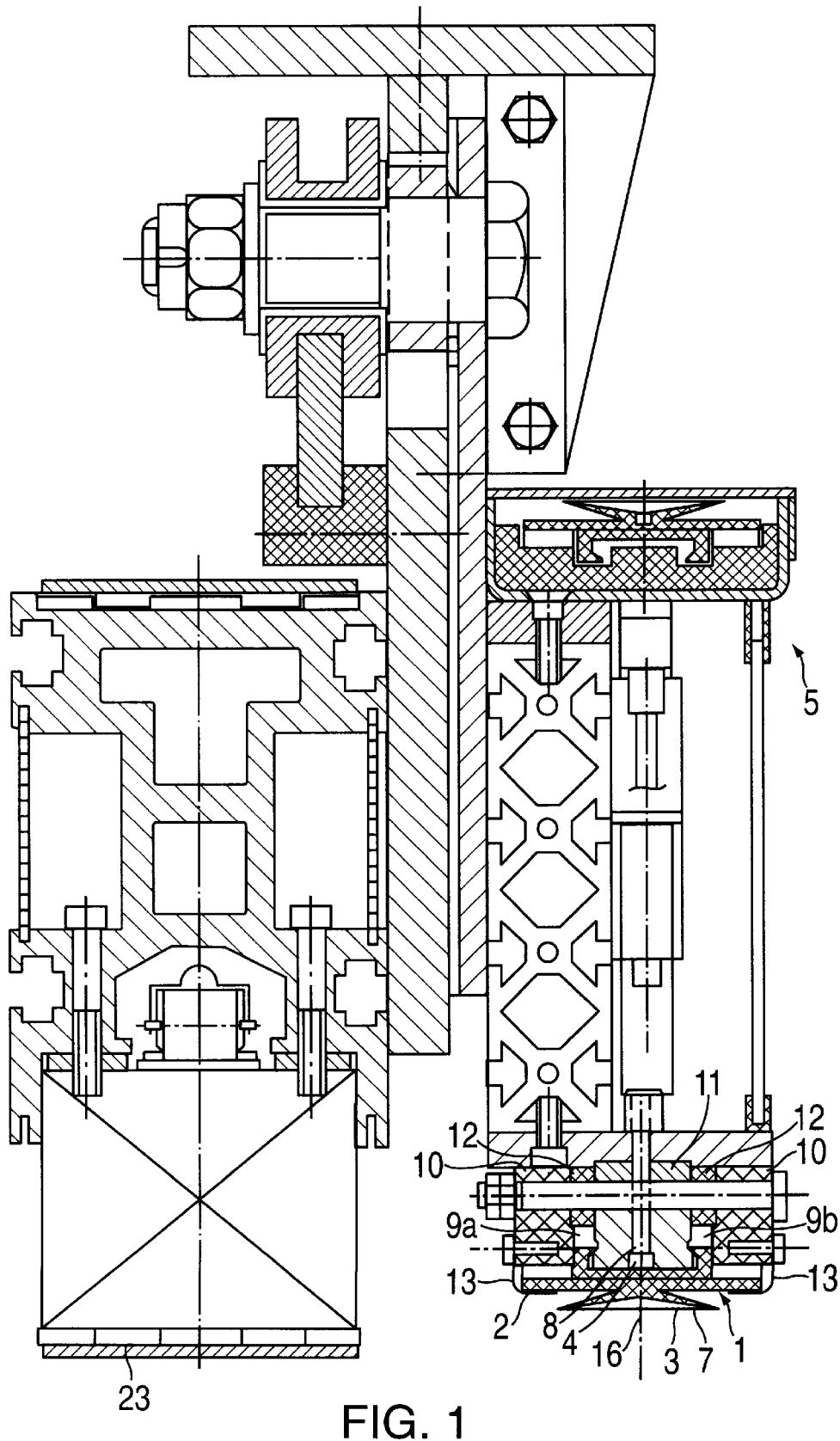
FIG. 1 shows the conveyor belt in conjunction with a vacuum device.

The figures show a conveyor belt 1, in particular a vacuum conveyor belt 1 for the suspended transport of workpieces, in particular of platelike workpieces, such as metal sheets or boards. As is evident from FIG. 2, the basic design of this conveyor belt 1 comprises a belt body 2 with suction orifices 3. The suction orifices 3 are connected to a vacuum duct 4 in a vacuum device 5. The conveyor belt 1 is driven in rotation and, together with the workpieces to be laid onto it, is guided, in bearing contact, past the vacuum device 5 in the transport (plane) direction. The workpieces are retained on the conveyor belt 1 by generating a vacuum in the vacuum duct 4 and consequently at the suction orifices 3. The conveyor belt 1 additionally has two or more rear sealing lips 6 integrally formed on the belt body 2. Finally, front suction protuberances 7, into which the suction orifices 3 open, are provided.

The vacuum duct 4 extends in the longitudinal direction of the vacuum device 5. The vacuum duct 4 is acted upon by means of suction bores 8 which are connected to said duct. For sealing off the vacuum duct 4, the two sealing lips 6 engage into at least one sealing gap 9 in the vacuum device 5. In the exemplary embodiment, each sealing lip 6 is provided with its own sealing gap 9a, 9b in the vacuum device 5. The vacuum device 5 has, in cross section, a guide body 11 which is arranged between at least two mutually opposite centering jaws 10 so as to form the respective sealing gap 9a, 9b. On both sides of the guide body 11, in the cross section between the guide body 11 and the respective centering jaw 10, foam centering bodies 12, capable of being compressed elastically so as to set the respective sealing gap 9a, 9b, are provided for retaining the guide body 11 centrally between the centering jaws 10. There are, in addition, angle pieces 13 which are flanged to the centering jaws 10 on the outside and which engage under the centering jaws 10 on the transport side, while at the same time guiding the conveyor belt 1 which bears on the centering jaws 10 and on the guide piece 11. These angle pieces 13 serve both for guiding the conveyor belt 1 and for protecting it.

The guide body 11 is aligned between the centering jaws 10 with the aid of the foam centering bodies 12, so as to form sealing gaps 9a, 9b of equal size. This ensures that the sealing lips 6, centering themselves and, at the same time, sealing off the vacuum duct 4, are held under prestress in the sealing gaps 9a, 9b. For this purpose, in particular, the two sealing lips 6 are designed opposite one another in relation to the suction orifices 3, in each case with inwardly directed sealing teeth 14. These sealing teeth 14 engage in each case into corresponding chamfers 15 in the sealing gap 9a, 9b. Each sealing tooth 14 has two tooth edges 14a, 14b which are designed as a sealing edge 14a and closing edge 14b and which form an acute angle α between them (see FIG. 2). Furthermore, the sealing edge 14a bears on a sealing chamfer edge 15a of the chamfer 15 at a predetermined angle β in relation to the transport plane direction T, usually the horizontal. This sealing chamfer edge 15a likewise has a predetermined inclination y in relation to the transport plane direction T. These individual geometric ratios are illustrated, in particular, in FIG. 2. The angles α and β amount in each case to about 20° to 60°, preferably 30°, and γ ranges between 30° and 80° and is preferably about 50°. This applies in each case to the noninstalled state. Here, the sealing lips 6 have a prestress (illustrated by broken lines in FIG. 2). The aperture angle δ of the chamfer 15 is about 90° to 120°. The angle of inclination ε, which represents, as it were, the prestress, is in the range of between about 85° and 95°. The angle, not specified in any more detail, between the sealing edge 33a and the sealing chamfer edge 34a is about 15° to 30°.

Figure 2:
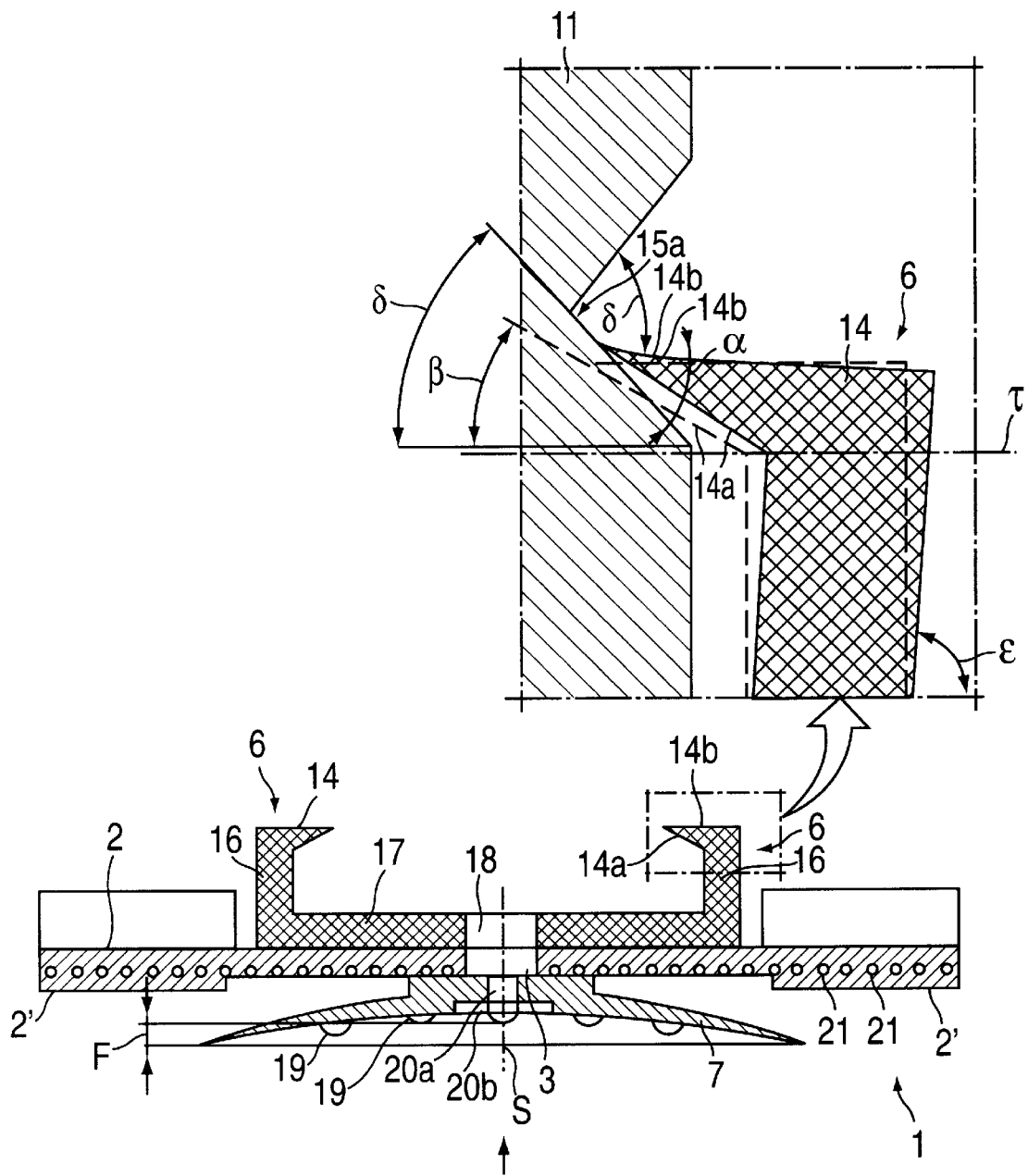
FIG. 2 shows the conveyor belt according to FIG. 1 in an enlarged illustration, together with an enlarged detail from FIG. 1.

This ensures, altogether, that, when the sealing lip 6, which is under prestress, is inserted into the sealing gaps 9a, 9b, it is deformed in the way indicated in the detail in FIG. 2 (illustrated by unbroken lines). The result of the "pivoting movement" of the sealing teeth 14 which is shown in this way is that the sealing edge 14a bears with a relatively large contact face on the sealing chamfer edge 15a. This altogether optimizes the sealing off of the sealing gap 9a, 9b. It is ensured, moreover, that the sealing lips 6, which are generally designed as a U-profile, come to bear with their U-base particularly closely against the guide body 11. Consequently, not only self-centering of the sealing lip 6 is achieved, but, at the same time, also reliable sealing off of the vacuum duct 4.

According to the exemplary embodiment, the acute angle α is about 30°. The angles β, γ have the following values: β about 30° and y about 50°. The sealing teeth 14 are in each case integrally formed, on the headside, on a sealing web 16 standing upright at the rear on the belt body 2. This sealing web 16 is usually arranged vertically on the belt body 2. As already stated, the sealing lips 6 are designed as a U-profile integrally formed on the belt body 2, each sealing web 16, together with the headside sealing tooth 14, forming a U-leg, and the two sealing webs 16 being connected on the foot side, to form a U-base, by means of a supporting web 17. Furthermore, this supporting web 17 ensures that the sealing lips 6 are connected to the belt body 2.

The supporting web 17 has at least one central passage orifice 18 which is arranged concentrically in relation to the corresponding suction orifice 3 in the belt body 2. As is evident from FIG. 2, the sealing webs 16 are arranged with their sealing teeth 14 mirror symmetrically in relation to the passage orifice 18 and the suction orifice 3 with respect to a mirror axis %. A corresponding passage orifice 18 is provided for each suction orifice 3. In the course of a revolution of the conveyor belt 1, the suction orifices 3 and the passage orifices 18 move on a plane of longitudinal extent L of the vacuum duct 4 (see, in particular, FIG. 1). The plane of longitudinal extent L coincides with the mirror axis S.

Due to the symmetric design of the conveyor belt 1 and the self-centering effect of the sealing lips 6, maximum overlap of the vacuum duct 4 with the suction orifices 3 is achieved during the rotation of the conveyor belt 1. This is important not only with a view to the leakages to be avoided, but also in respect of achievable cycle times when workpieces are being sucked up and discarded.

In the exemplary embodiment, the suction protuberances 7 are designed as suction cups 7 with internal bosses 19, and damaged suction cups 7 can be exchanged and fastened to the belt body 2 by means of a rivet or screw connection. As is evident from FIG. 2, the bosses 19 are designed to limit a spring excursion F of the suction cup 7. Vacuum extension orifices 20 for the suction orifices 3 are additionally located in the suction cups 7. The vacuum extension orifices 20 are designed with a T-shaped cross section, the vertical web 20a having a smaller diameter than the respective suction orifice 3 and the horizontal web 20b having a larger diameter than the corresponding suction orifice 3. An increase in the flow velocity in the region of the vertical web 20a is achieved thereby.

The belt body 2 is generally manufactured from PUR having a Shore hardness of about 90. By contrast, PUR having a Shore hardness of about 55 is used for the most part for manufacturing the sealing lips and suction cups 7 and the bosses 19. As is evident from FIG. 2, the belt body 2 has, in the region of its contact face with the vacuum device 5 or with the guide body 11 located there, a PA coating 2' for the purpose of reducing the coefficient of friction. Said coating is provided on the rear side of the belt body 2, said rear side facing the vacuum device 5, in the region of the above-mentioned contact face with the vacuum device 5. The belt body 2 may additionally have steel cords 21 introduced in the longitudinal direction for stabilization. Apart from this, transverse stiffenings (not shown) and, if appropriate, ferromagnetic inserts (likewise not illustrated) may be introduced into the belt body 2. The belt body 2, the sealing lips 6 designed as a U-profile and the suction cups 7 are in each case connected to one another by means of plastic welded joints. Efficient and accurate manufacture can thereby be achieved. Of course, the belt body 2 may also have a synthetic fabric. For example, a covering consisting of a fabric coat is conceivable in this respect.

The vacuum device 5 shown, together with a magnetic device 22, forms as a whole a holding device, past which the conveyor belt 1 is guided. Of course, the conveyor belt 1 may also be combined solely with a vacuum device 5 or with the above-mentioned magnetic device 22. In all events, according to the exemplary embodiment (see FIG. 1), a holding device consisting of at least one magnetic device 22 with at least one magnetic conveyor belt 23 and the vacuum device 5, separate from this, with the vacuum conveyor belt 1 according to the invention are provided. The magnetic device 22 and the vacuum device 5 can be brought with their respective conveyor belts 1, 23 alternately into contact with the workpieces to be transported. This is not illustrated in detail any further.

Figure 3:
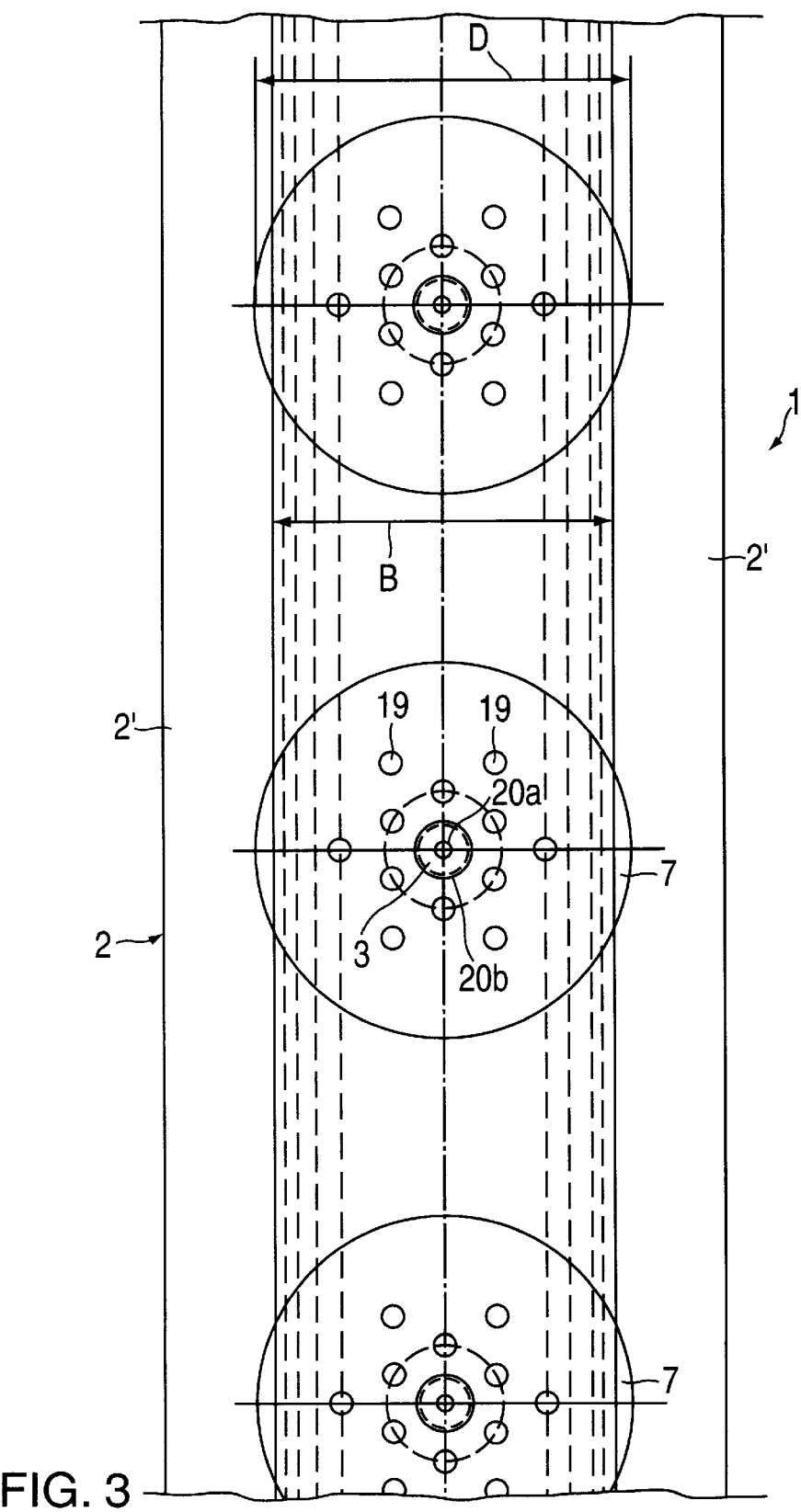
FIG. 3 shows a view of the conveyor belt according to FIG. 2 in the direction of the arrow A.

As is evident from FIG. 3, the bosses 19 are arranged on concentric circles around the vacuum extension orifice 20. Moreover, the suction cups 7 are of circular design and have a diameter D which is larger than the width B of the belt body 2. In this way, even workpieces or metal sheets or boards, the width of which exceeds the width B of the belt body 2 by a multiple, are held satisfactorily.

What is claimed is:

1. A conveyor belt (1) for the transport of workpieces, in particular for the suspended transport of platelike workpieces, such as metal sheets or boards, with a belt body (2) having suction orifices (3) which are connected to a vacuum duct (4) in a vacuum device (5), the conveyor belt (1), together with the workpieces to be laid onto it, being guided past the vacuum device (5) in the transport plane direction (T), and the workpieces being retained on the conveyor belt (1) by generating a vacuum in the vacuum duct (4) and consequently at the suction orifices (3), and with two or more rear sealing lips (6) integrally formed on the belt body (2), the sealing lips (6) engaging into at least one sealing gap (9) in the vacuum device (5) for the purpose of sealing off the vacuum duct (4), wherein each sealing lip (6) is provided with its own sealing gap (9a, 9b) in the vacuum device (5), and wherein the sealing lips (6), centering themselves and, at the same time, sealing off the vacuum duct (4), are held under prestress in the sealing gaps (9a, 9b).

2. The conveyor belt (1) as claimed in claim 1, wherein the two sealing lips (6) are designed, opposite one another in relation to the suction orifices (3), in each case with inwardly directed sealing teeth (14), and wherein the sealing teeth (14) engage in each case into corresponding chamfers (15) in the sealing gap (9a, 9b).

3. The conveyor belt (1) as claimed in claim 1, wherein each sealing tooth (14) has two tooth edges (14a, 14b) which are designed as a sealing edge (14a) and a closing edge (14b) and which form an acute angle ($\alpha$) between them, the sealing edge (14a) bearing on a sealing chamfer edge (15a) of the chamfer (15) at a predetermined angle ($\beta$) in relation to the transport plane direction (T), said sealing chamfer edge likewise being at a predetermined inclination ($\gamma$) in relation to the transport plane direction (T).

4. The conveyor belt (1) as claimed in one of claim 1, wherein the acute angle ($\alpha$) is about 30°.

5. The conveyor belt (1) as claimed in one of claim 1, wherein the sealing teeth (14) are integrally formed in each case, on the head side, on a sealing web (16) standing upright at the rear on the belt body (2).

6. The conveyor belt (1) as claimed in one of claim 1, wherein the sealing lips (6) are designed as a U-profile integrally formed on the belt body (2), each sealing web (16), together with the headside sealing tooth (14), forming a U-leg, and the two sealing webs (16) being connected on the foot side, so as to form a U-base, by means of a supporting web (17).

7. The conveyor belt (1) as claimed in one of claim 1, wherein the supporting web (17) has at least one central passage orifice (18) which is arranged concentrically in relation to the corresponding suction orifice (3) in the belt body (2), and wherein the sealing webs (16), together with the sealing teeth (14), are arranged mirrorsymmetrically in relation to the passage orifice (18) and the suction orifice (3).

8. The conveyor belt (1) as claimed in one of claim 1, wherein a corresponding passage orifice (18) is provided for each suction orifice (3).

9. The conveyor belt (1) as claimed in one of claim 1, wherein, in the course of a revolution of the conveyor belt (1), the suction orifices (3) and the passage orifices (18) move in each case on a plane of longitudinal extent (L) of the vacuum duct (4).

10. The conveyor belt (1) as claimed in one of claim 1, wherein front suction protuberances (7), into which the suction orifices (3) open, are provided, the suction protuberances (7) being designed as suction cups (7) with internal bosses (19).

11. The conveyor belt (1) as claimed in one of claim 1, wherein the bosses (19) are designed to limit the spring excursion (F) of the suction cup (7).

12. The conveyor belt (1) as claimed in one of claim 1, wherein the suction cups (7) have vacuum extension orifices (20) for the suction orifices (3).

13. The conveyor belt (1) as claimed in one of claim 1, wherein the belt body (2) is manufactured essentially from PUR having a Shore hardness of 90.

14. The conveyor belt (1) as claimed in one of claim 1, wherein the sealing lips (6) and the suction cups (7) with bosses (19) are manufactured for the most part from PUR having a Shore hardness of 55.

15. The conveyor belt (1) as claimed in one of claim 1, wherein, in order to reduce the coefficient of friction on its rear side facing the vacuum device (5), the belt body (2) has a PA coating (2') in the region of a contact face with the vacuum device (5).

16. The conveyor belt (1) as claimed in one of claim 1, wherein the belt body (2) has steel cords (21) introduced in the longitudinal direction for stabilization.

17. The conveyor belt (1) as claimed in one of claim 1, wherein the belt body (2) has, introduced, transverse stiffenings and, if appropriate, ferromagnetic inserts.

18. The conveyor belt (1) as claimed in one of claims 1, wherein the belt body (2), the sealing lips (6) and the suction cups (7) are in each case connected to one another by means of welded joints, and wherein the sealing lips (6), centering themselves and, at the same time, sealing off the vacuum duct (4), are held under prestress in the sealing gaps (9a, 9b).

* * * * *